May 5, 1925.

W. OWEN

APPARATUS FOR FEEDING GLASS BLANKS

Filed May 13, 1924     3 Sheets-Sheet 1

1,536,918

INVENTOR
Wm Owen
by
James C Bradley
atty

May 5, 1925.

W. OWEN 1,536,918

APPARATUS FOR FEEDING GLASS BLANKS

Filed May 13, 1924

3 Sheets-Sheet 3

INVENTOR

Patented May 5, 1925.

1,536,918

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

APPARATUS FOR FEEDING GLASS BLANKS.

Application filed May 13, 1924. Serial No. 713,082.

*To all whom it may concern:*

Be it known that I, WILLIAM OWEN, a citizen of the United States, and a resident of Pittsburgh, in the county of Allegheny and State of Pennsylvania, have made a new and useful invention in Improvements in an Apparatus for Feeding Glass Blanks, of which the following is a specification.

Figure 1:
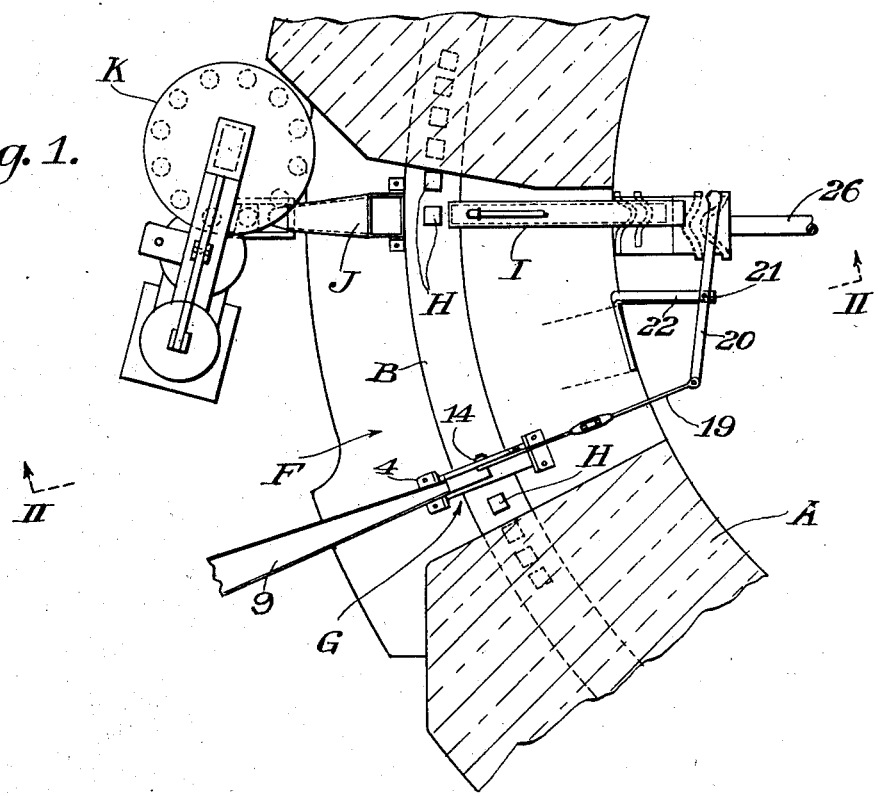
Figure 2:
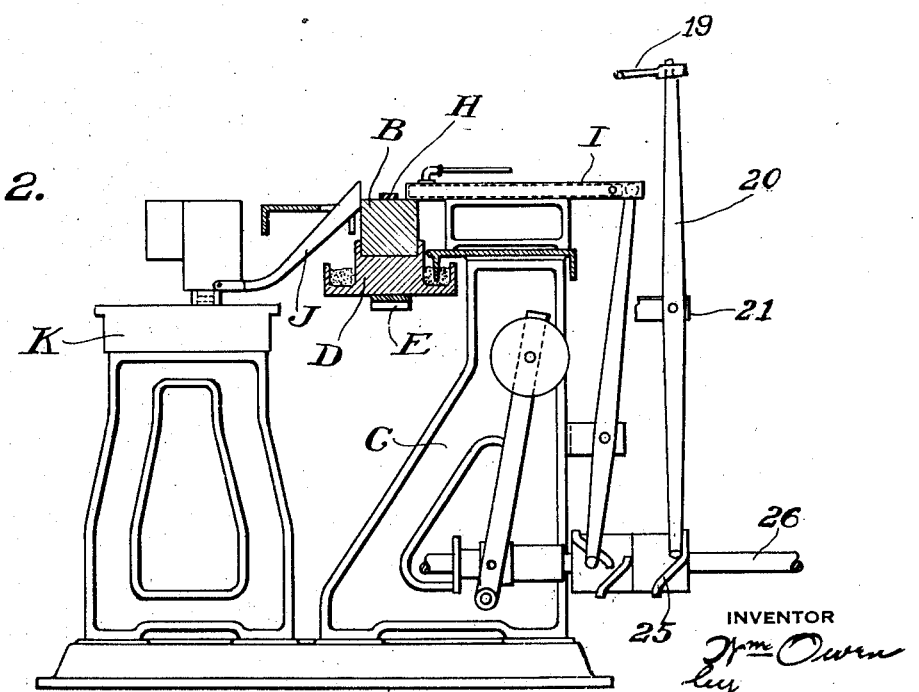
Figure 3:
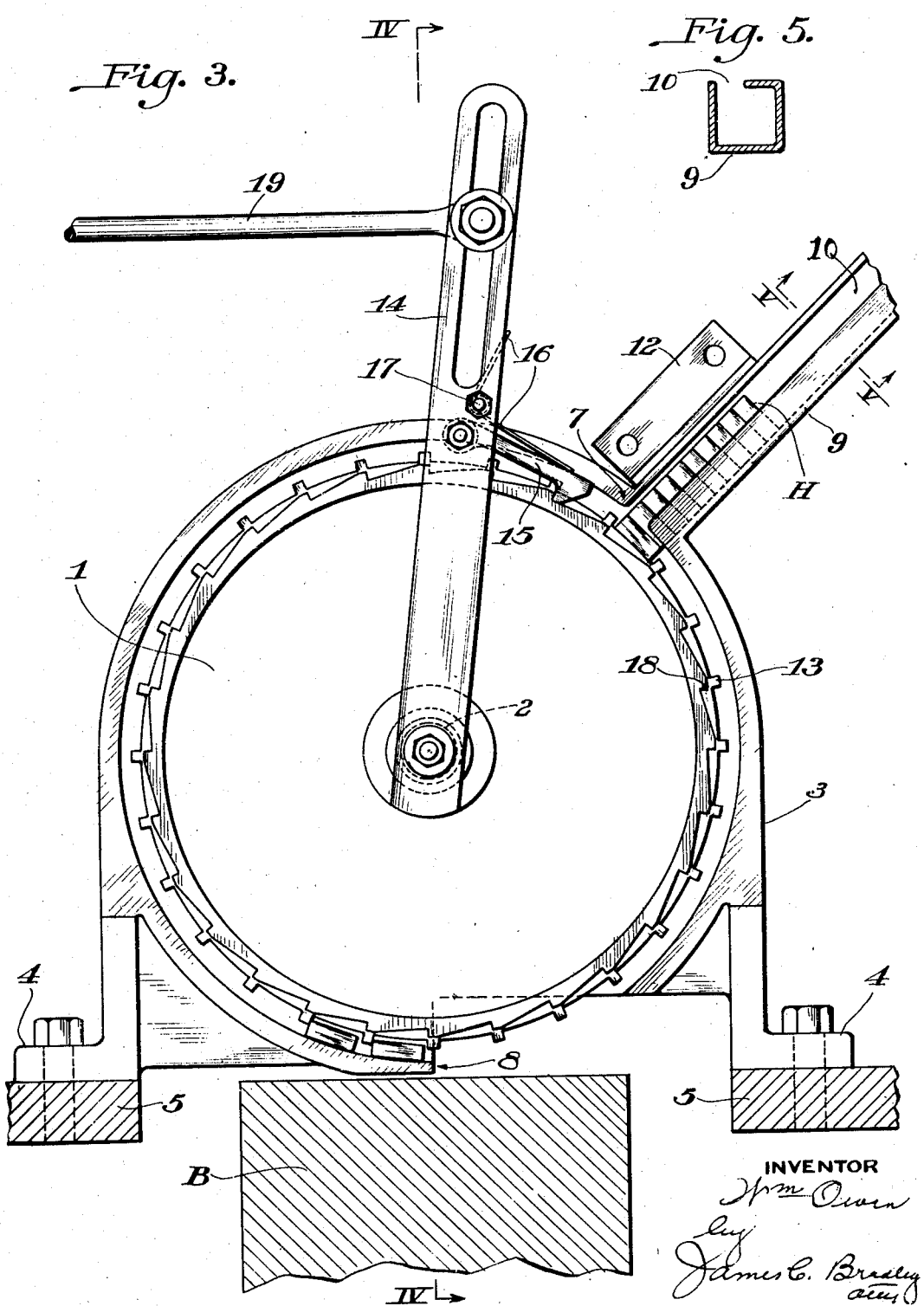
Figure 4:
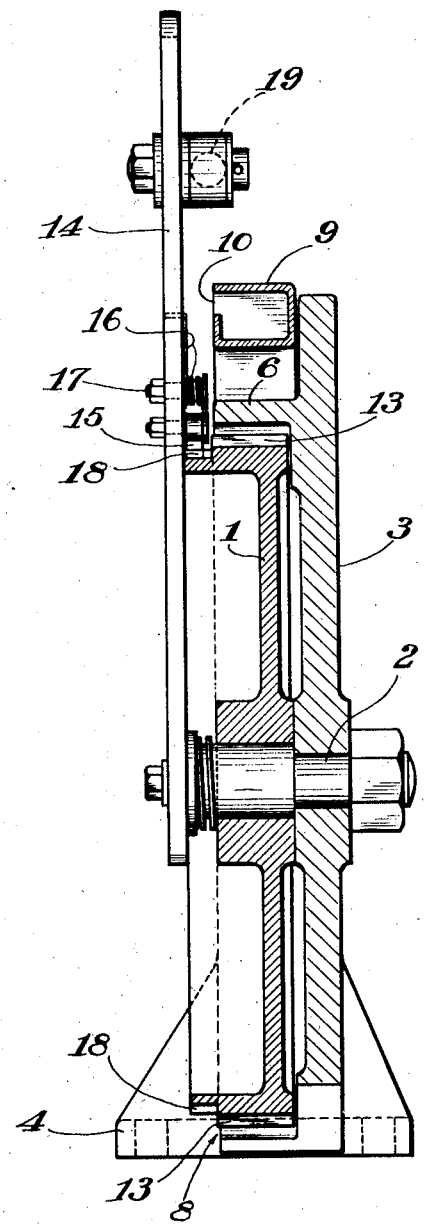

The invention relates to apparatus for feeding glass blanks, such as used for spectacles and lenses of various kinds, to the carrier of a heating device preliminary to the pressing or molding operation. The feeding means is illustrated in connection with a circular heating chamber having an annular carrier for moving the blanks slowly through the chamber, but the feeding means are not limited to use with heating apparatus or carrier of this particular type. The invention has for its principal objects, the provision of improved feeding means which will feed the blanks automatically at uniform intervals, which will handle blanks of varying diameter and thickness between reasonable limits, which is of simple construction, and which is not liable to get out of order. One embodiment of the invention is illustrated in the accompanying drawings, wherein:

Figure 1 is a diagrammatic plan view showing a part of the apparatus. Fig. 2 is a section on the line II—II of Fig. 1. Fig. 3 is a side elevation of the feeding device. Fig. 4 is a section on the line IV—IV of Fig. 3. And Fig. 5 is a section on the line V—V of Fig. 3.

In carrying out the invention in its preferred form, an annular heating chamber is employed for bringing the blanks to a plastic condition for molding or pressing, after which they are discharged to a suitable press and pressed into circular form. The present invention relates particularly to the means for feeding the angular blanks to the carrier or hearth which transports them throughout the length of the chamber, and briefly stated, this comprises a wheel arranged transversely of the hearth or carrier and provided with recesses for the blanks in combination with an inclined chute leading to the periphery of the wheel and so arranged that the blanks are fed one by one onto the wheel as it is given an intermittent movement of rotation to carry the holding recesses past the chute. A fixed retaining flange is provided in opposition to the blanks on the wheel, so that they are maintained in position and carried ahead by the wheel until they arrive at a point over the hearth or carrier, at which point, the flange terminates so that the blanks are permitted to drop upon the hearth.

Referring first to the general arrangement of parts as indicated in Figs. 1 and 2, A is the annular heating chamber for the blanks which is provided with a carrier B housed in the chamber and made of refractory material, such as clay; C is the framework of the machine upon which the carrier is mounted for rotation, such carrier being supported from the annular casting D and driven from the circular rack E; F is an opening secured by cutting away the side and top walls of the chamber A so as to expose the carrier and give an opportunity of feeding the blanks to such carrier and removing them therefrom; G is the feeding device for supplying the blanks H, one by one, to the carrier B at suitable intervals, such feeding device being the feature to which the present invention is particularly directed; I is a pusher device for removing the blanks from the carrier B after they have made the circuit of the furnace and have arrived at a point opposite the press at a temperature suitable for shaping or molding; J is a chute for receiving the blanks from the pusher device; and K is the press to which the chute discharges, such press being also referred to as a molding or pressing machine.

The feeding device is shown in detail in Figs. 3 and 4, and includes a wheel 1 mounted for rotation upon an axle 2 and a plate 3 carrying such axle. As indicated in Fig. 3, the plate 3 has integral with its base a pair of laterally extending flanges 4, 4, which are bolted to the plates 5, 5, constituting a portion of the framework of the heating chamber. The plate 3 has projecting from its side adjacent the wheel 1 a flange 6, which extends around the wheel from the point marked 7 (Fig. 3) to the point marked 8, such flange being spaced away from the periphery of the wheel to provide space for the blanks as hereinafter described, and serves to maintain such blanks in their relation to the wheel until they are discharged at the point 8. The blanks H, which are substantially square, are fed to the periphery of the wheel through the chute 9 which is inclined at an angle of approximately 45 degrees. This chute is preferably open along one side as indicated at 10 (Fig. 5), so that the blanks may be observed and access given thereto in case they require manual adjustment. The entire side of the chute is cut away at the extreme upper end, not shown, at which point the blanks are supplied to the chute by the operator. The blanks move down the chute by gravity and drop into the recesses formed on the periphery of the wheel. The chute is supported in position upon the plate 3 by means of suitable brackets 12 bolted or riveted to the chute and to the plate.

The periphery of the wheel 1 is provided with outwardly projecting fins or ribs 13 of less height than the thickness of the blanks H and adapted to engage the lower sides of the blanks as indicated in Fig. 3 and move them around the wheel one by one as the wheel is given its step by step movement forward, such movement being just sufficient in each case, to carry a blank out of alignment with the other blanks in the chute and bring a new recess in the wheel in position to receive the next blank in the chute. Such blank drops down into the recess as soon as such recess is brought around far enough to receive the blank. The blanks are carried around the periphery of the wheel in this manner from the point 7 to the point 8, at which time they are discharged onto the hearth, the timing of the movement of the wheel being such as to give the desired spacing between the blanks upon the hearth or carrier. During this movement from the chute to the hearth, the blanks are maintained in their proper relative position with respect to the wheel by the retaining flange 6 which projects over the periphery of the wheel.

The wheel is preferably given its step by step rotary movement by means of the lever 14 pivoted on the axle 2 of the wheel and provided with the dog 15. This dog is pressed downwardly by means of a spring 16 coiled around the bolt 17, also carried by the lever. The periphery of the wheel is provided with the ratchet teeth 18 which are engaged by the dog, so that when the lever 14 is swung to the right, the wheel is given a movement of rotation. The lever 14 is operated by means of the connecting rod 19 which is engaged at its forward end by another lever 20 (Fig. 1) pivoted at 21 to a bracket 22 carried by the framework of the heating chamber. The other end of the lever 19 is in engagement with a cam 25. This cam is carried by a shaft 26, suitably driven from means, not shown. In this manner, the lever 14 is oscillated back and forth, giving the wheel 1 a step by step rotation, at each of which steps a blank is supplied to the wheel, while another is deposited upon the hearth B.

What I claim is:

1. In combination with a tunnel heating chamber and a carrier mounted for movement through the chamber, a wheel mounted for rotation transversely of the carrier thereabove and provided around its periphery with projecting spaced feeding members, an inclined blank carrying chute leading to the periphery of the wheel and adapted to feed the blanks therein against the periphery of the wheel, a retaining flange extending around the wheel outward of the blanks to a point above the carrier and means for giving the wheel an intermittent step by step movement.

2. In combination with a tunnel heating chamber and a carrier mounted for movement through the chamber, a wheel mounted for rotation transversely of the carrier thereabove and provided around its periphery with projecting spaced transverse ribs projecting from the face of the wheel a distance less than the thickness of the blanks to be fed, an inclined blank carrying chute leading to the periphery of the wheel and adapted to feed the blanks therein against the periphery of the wheel, a retaining flange extending around the wheel outward of the blanks to a point above the carrier and means for giving the wheel an intermittent step by step movement.

3. In combination with a tunnel heating chamber and a carrier mounted for movement through the chamber, a wheel mounted for rotation transversely of the carrier thereabove and provided around its periphery with spaced recesses for the blanks to be fed, an inclined blank carrying chute leading to the periphery of the wheel and adapted to feed the blanks therein into said recesses, a retaining flange extending around the wheel in opposition to the blanks to a point above the carrier, and means for giving the wheel an intermittent step by step movement.

In testimony whereof, I have hereunto subscribed my name this 6th day of May, 1924.

WILLIAM OWEN.